Figure 1:
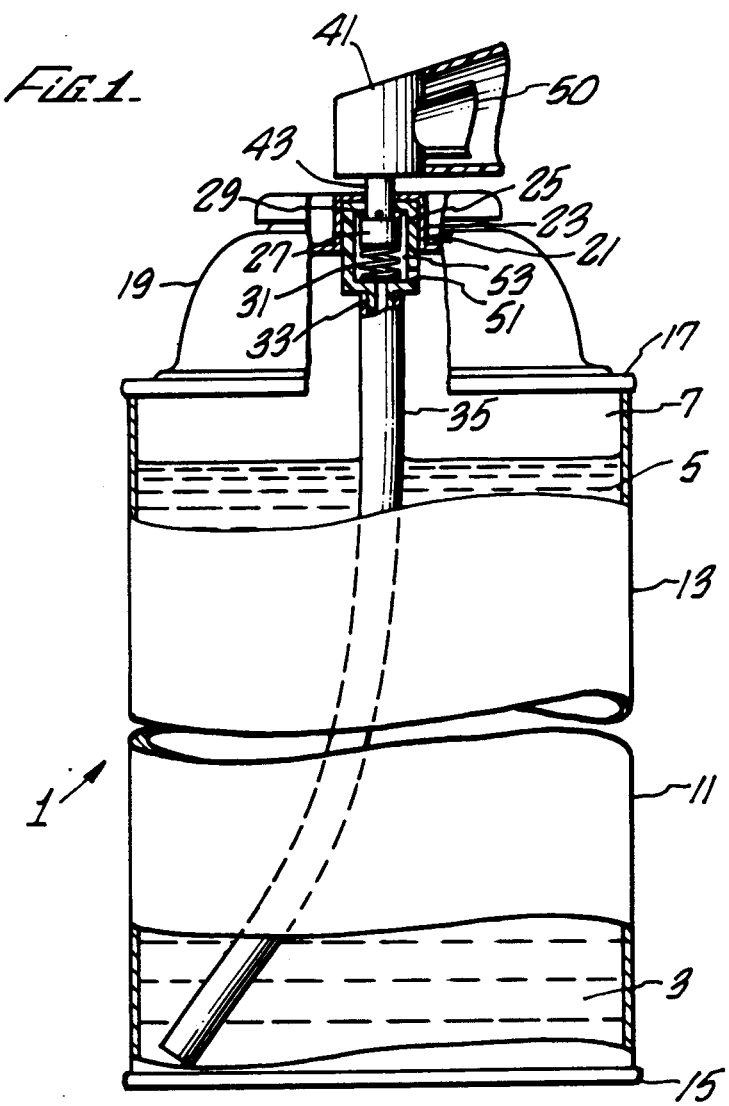
Figure 2:
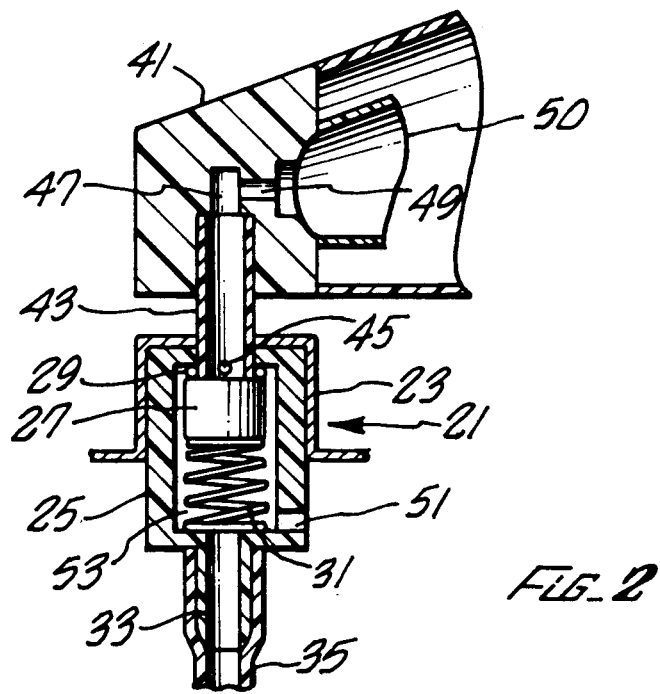

United States Patent [19]

Becker et al.

[11] Patent Number: 5,057,243
[45] Date of Patent: Oct. 15, 1991

[54] AEROSOL DIFFUSION FOGGER

[75] Inventors: Martin J. Becker, Glendale; James G. Gill, North Hollywood, both of Calif.

[73] Assignee: Pro Efx, Inc., Hollywood, Calif.

[21] Appl. No.: 203,766

[22] Filed: Jun. 8, 1988

[51] Int. Cl.⁵ .............................................. C09K 3/30
[52] U.S. Cl. ..................................... 252/305; 252/90; 252/570; 222/394; 430/396
[58] Field of Search ................... 106/13; 252/570, 90, 252/305; 430/396; 222/394

[56] References Cited

U.S. PATENT DOCUMENTS

| | | |
|---|---|---|
| 1,895,765 | 1/1933 | Muller . |
| 3,137,416 | 6/1964 | Shepherd et al. ............... 252/305 |
| 3,207,386 | 9/1965 | Presant et al. . |
| 3,346,195 | 10/1967 | Groth ........................... 222/394 |
| 3,349,042 | 10/1967 | Andrews . |
| 3,419,658 | 12/1968 | Saunders . |
| 3,499,723 | 3/1970 | Hamilton et al. . |
| 4,301,674 | 11/1981 | Haines . |
| 4,326,119 | 4/1982 | Swiatosz . |
| 4,330,422 | 5/1982 | Tesch . |
| 4,425,164 | 1/1984 | Bliznak et al. ................ 252/305 |

FOREIGN PATENT DOCUMENTS 1341709 9/1962 France .
1243381 8/1968 United Kingdom .

Primary Examiner—Charles L. Bowers, Jr.
Assistant Examiner—Thorl Chea
Attorney, Agent, or Firm—Charles Berman

[57] ABSTRACT

An aerosol diffusion fogger apparatus has an aerosol can containing about 10% by weight light white mineral oil and about 90% by weight of an isobutane and propane propellant mixture and having an aerosol valve with a vapor tap and having a fine aerosol nozzle for producing a fine, evenly dispersed and stable fog having particle sizes less than one micron for use in special effects cinematography and still photography.

3 Claims, 2 Drawing Sheets

Fig. 3

```
           ┌──────────────────┐
           │     AGITATE      │──63
           └──────────────────┘
                    ↓
         ┌────────────────────────┐
         │ MIX PROPELLANT AND OIL │──65
         └────────────────────────┘
                    ↓
            ┌───────────────┐
            │ POINT NOZZLE  │──67
            └───────────────┘
  61→              ↓
            ┌───────────────┐
            │ PRESS PLUNGER │──71
            └───────────────┘
                    ↓
          ┌────────────────────┐
          │ LIFT OIL-PROPELLANT│──73
          └────────────────────┘
                    ↓
            ┌───────────────┐
            │   MIX VAPOR   │──75
            └───────────────┘
                    ↓
         ┌─────────────────────────┐
         │ ABRUPTLY REDUCE PRESSURE│──77
         └─────────────────────────┘
                    ↓
       ┌────────────────────────────┐
       │ DISPENSE SUBMICRON PARTICLES│──79
       └────────────────────────────┘
                    ↓
        ┌──────────────────────────┐
        │ AWAIT MOMENTARY DISPERSION│──81
        └──────────────────────────┘
                    ↓
          ┌──────────────────────┐
          │  ILLUMINATE THROUGH  │──83
          │    FOG DISPERSION    │
          └──────────────────────┘
                    ↓
           ┌───────────────────┐
           │  PHOTOGRAPH OBJECT│──85
           └───────────────────┘
                    ↓
              ┌─────────┐
              │  IN FOG │──86
              └─────────┘
                    ↓
            ┌─────────────┐
            │ THROUGH FOG │──87
            └─────────────┘
                    ↓
              ┌─────────┐
              │  OF FOG │──88
              └─────────┘
```

AEROSOL DIFFUSION FOGGER

BACKGROUND OF THE INVENTION

Cinematographers and still photographers face a problem when wishing to photograph a subject using light diffused through smoke, fog or mist or when trying to photograph objects through smoke, fog or mist or when trying to photograph rays of light within smoke, fog or mist or when trying to photograph the smoke, fog or mist itself. While machines are available which produce such effects, the machines are bulky and difficult to transport and relocate and often require personnel specifically assigned for their operation.

Some machines need advance preparation so that their use must be preplanned, delaying operations or requiring additional time for retakes. The necessity of preplanning and delaying before use of existing machines may increase difficulty or render impossible the use or capturing of transient conditions.

A need exists for a diffusion fogger which is highly mobile and portable and quick and easy to use. That need has persisted without solution over a long time.

SUMMARY OF THE INVENTION

The present invention solves the problems of long standing in the prior art.

The present invention provides a hand-held portable aerosol diffusion fogger which uses intimate suspensions of light white mineral oil and a liquefied gaseous propellant which are dispensed under an abrupt pressure change while being mixed with separate vapors of the propellant to produce a fine, evenly dispersed and stable fog having particle sizes less than one micron. After a few moments to allow for uniform dispersion the fog appears as smoke, mist or fog and diffuses light projected therethrough, allows light rays to be photographed therein and allows objects to be photographed therethrough.

An aerosol diffusion fogger apparatus has an aerosol can containing about 10% by weight light white mineral oil and about 90% by weight of an isobutane and propane propellant mixture and having an aerosol valve with a vapor tap and having a fine aerosol nozzle for producing a fine, evenly dispersed and stable fog having particle sizes less than one micron.

A preferred photographic diffusion fog producing mixture has about 5–20% light white mineral oil and about 80–95% of a hydrocarbon propellant for dispensing from a can under the vaporization pressure of the propellant.

In the preferred product the hydrocarbon propellant comprises a mixture of isobutane and propane.

Preferably the light white mineral oil is light white food grade mineral oil.

A preferred oil is a light white food grade mineral oil comprising a homogeneous mixture of aliphatic and alicyclic hydrocarbons.

The preferred method of creating a photographic diffusion fog for a diffused lighting effect and for photographing light rays and objects through the fog includes intimately mixing a dispersion of light white food grade mineral oil in a hydrocarbon propellant and dispensing the dispersion through an aerosol nozzle and producing particles having a size less than one micron.

In the preferred method the mixing further includes releasing a vapor of the propellant through the aerosol nozzle concurrently with the release of the intimate dispersion of the propellant and the light white mineral oil.

The intimately mixed dispersion of the light white mineral oil and the hydrocarbon propellant is pumped through a long tube extending to the bottom of an aerosol container. Concurrently vapors of the hydrocarbon propellant flow through a vapor tap. The vapor and intimate mixture rapidly decompress and atomize into submicron particles in a nozzle.

After releasing the submicron particles in the atmosphere and allowing the resultant fog to stabilize, objects are photographed with light diffused through the fog.

After releasing the submicron particles in the atmosphere and allowing the fog to stabilize, objects are photographed through the fog.

These and further and other objects and features of the invention are apparent in the disclosure which includes the above and ongoing description, including the claims and the drawings.

BRIEF DESCRIPTION OF THE DRAWINGS

FIG. 1 is a view partially in cross section of an aerosol diffusion fogger of the present invention.

FIG. 2 is a detail of one form of a valve.

FIG. 3 is a flow chart of steps of the present invention.

DETAILED DESCRIPTION OF THE DRAWINGS

Referring to FIG. 1 a diffusion fogger of the present invention is generally indicated by the numeral 1. The fogger 1 has contents of about 10% light white mineral oil 3 and about 90% of a propellant mixture 5 of isobutane and propane. The relative percentages of the fluids remain substantially constant during depletion of contents of the can by virtue of the substantially constant composition of the exhaust from the can. While less propellant can be used effectively, it is desirable to have an excess of the propellant in the can. The excess propellant ensures that the fog will be delivered under the pressure differential necessary to produce a fine particle size and to project the particles an appreciable distance from the nozzle.

The excess propellant and excess pressure is highly desired so that the particles are sufficiently projected for dispersion so as not to agglomerate and so that all of the oil is dispersed under sufficient pressure to ensure atomization of the oil particles to less than one micron in size so that the oil particles do not gather on adjacent surfaces or collect on horizontal surfaces.

Any suitable light white mineral oil may be used. Preferably the mineral oil is a food grade mineral oil which is suitable for use on food contact surfaces and food processors which require lubrication. Preferably the oil is a homogeneous mixture of complete aliphatic and alicyclic hydrocarbons. One suitable source markets its product under the trademark RUDOL.

A preferred propellant is a mixture of isobutane and propane, preferably in equal parts. Such propellants are widely used as aerosol propellants. Examples of propellants are available under the trademark A-55 or M-55.

A 10% solution of oil in the propellant is preferred. 5–20% solutions or mixtures may be used. Too little oil wastes propellant. Too much oil wastes oil. Too much oil renders incorrect particle size or incorrect particle projection or both upon near exhaustion of the propellant.

The oil may be dissolved in the propellant or the oil may form a dispersion or suspension in the propellant. Preferably the container is agitated before exhausting the propellant and oil.

Volume 7 above the surface of propellant 5 contains vaporized propellant. The vapor pressure provides the dispensing force.

Aerosol container 11 has a side wall 13 and a bottom wall 15. A top wall 17 has edges joined to an upper edge of the side wall 13. A dome-shaped central portion 19 contains the aerosol valve 21. The aerosol valve 21 is shown in a schematic embodiment in which the outer wall 23 holds the valve. An inner cylinder 25 receives a piston 27 which is forced upward against an O-ring seal 29 by spring 31. A nipple 33 on the lower end of the cylinder 25 receives an upper end of a tube 35. The lower end of the tube 35 has an opening which is positioned near an intersection of the side wall 13 and bottom wall 15 of the container 11. Pushing down on plunger 41 moves hollow shaft 43 downward unseating the piston 27 from the O-ring 29. That allows fluid to flow under pressure through radial opening 45 into the hollow shaft 43, into the vestibule 47 and out through the fine nozzle opening 49 as a fine mist. Mechanical breakup or swirl devices 50 swirl and deflect and break up the fine mist flowing from the nozzle.

In a preferred form of the invention cylinder 25 is provided with a vapor tap 51. Propellant vapor flows into chamber 53 through vapor tap 51. When push button 41 is depressed and hole 45 is communicated with chamber 53, vapor pressure of the propellant drives mixed propellant and oil upward through tube 35 and nipple 33 into chamber 53, where it mixes with vapor entering through port 51 before exiting 45 into the push button shaft 43, the vestibule 47 and outwardly with an abrupt pressure drop through nozzle 49. The diffusion fog is stable. After a few moments which allows uniform dispersion, the fog is ready for cinematography and still photography sessions.

As shown in FIG. 3 the steps of the invention, generally indicated by the numeral 61, involve agitating the can 63 and mixing the propellant and oil into an intimate dispersion 65, while pointing the nozzle 67. Steps 63, 65 and 67 occur simultaneously. The plunger is pressed 71, which lifts 73 the oil propellant dispersion and mixes the dispersion with vapor 75 and abruptly reduces pressure 77 in the nozzle, dispensing 79 submicron particles. Steps 71-79 take place concurrently and substantially simultaneously.

One awaits momentary dispersion 81 which takes less than a minute and then illuminates 83 an object through the dispersion and photographs 85 the object. The object may be photographed in the fog 86, through the fog 87, or the object may be the fog 88 or light rays showing through the fog. The entire process from the time that the can is first agitated and pointed takes for example about three minutes before photography may be begun. The submicron particles remain dispersed and the diffusion fog remains in place for a long period of time and may easily be replenished or renewed.

The fog produced by the invention has about the same effect as a 3-D fog filter, but does a much better job, as the diffusion gives definition to rays.

While the invention has been described with reference to specific embodiments, modifications and variations may be made without departing from the scope of the invention as defined in the following claims.

I claim:

1. Aerosol diffusion fogger apparatus for producing a fine light diffusion fog comprising an aerosol can containing about 10% by weight light white mineral oil and about 90% by weight of an isobutane and propane propellant mixture and having an aerosol valve and having a fine aerosol nozzle for producing a fine light diffusion fog having an average particle size less than about one micron.

2. Aerosol diffusion fogger apparatus for producing a fine light diffusion fog comprising a handheld portable aerosol can containing about 10% by weight mineral oil and about 90% by weight of a propellant and having an aerosol valve and having a fine aerosol nozzle for producing a fine light diffusion fog having an average particle size less than about one micron.

3. Aerosol diffusion fogger apparatus for producing a fine light diffusion fog comprising a hand-held portable can containing about 10% by weight mineral oil and about 90% by weight of an isobutane and propane propellant mixture and having an aerosol valve and having a fine aerosol nozzle for producing a fine light diffusion fog having an average particle size less than about one micron.

* * * * *